United States Patent [19]

Lankford, Jr.

[11] Patent Number: 4,775,548
[45] Date of Patent: Oct. 4, 1988

[54] METHOD OF PRODUCING CERAMIC COMPOSITION HAVING LOW FRICTION COEFFICIENT AT HIGH OPERATING TEMPERATURS

[75] Inventor: James Lankford, Jr., San Antonio, Tex.

[73] Assignee: Southwest Research Institute, San Antonio, Tex.

[21] Appl. No.: 18,627

[22] Filed: Feb. 25, 1987

[51] Int. Cl.⁴ ............................................. B05D 3/06
[52] U.S. Cl. .................................... 427/38; 427/250; 427/383.5
[58] Field of Search ....................... 427/38, 250, 383.5

Primdry Examiner—Bernard D. Pianalto
Attorney, Agent, or Firm—Thomas E. Sisson

[57] ABSTRACT

A method for producing a stable ceramic composition having a surface with a low friction coefficient and high wear resistance at high operating temperatures. A first deposition of a thin film of a metal ion is made upon the surface of the ceramic composition and then a first ion implantation of at least a portion of the metal ion is made into the near surface region of the composition. The implantation mixes the metal ion and the ceramic composition to form a near surface composite. The near surface composite is then oxidized sufficiently at high oxidizing temperatures to form an oxide gradient layer in the surface of the ceramic composition.

8 Claims, 1 Drawing Sheet

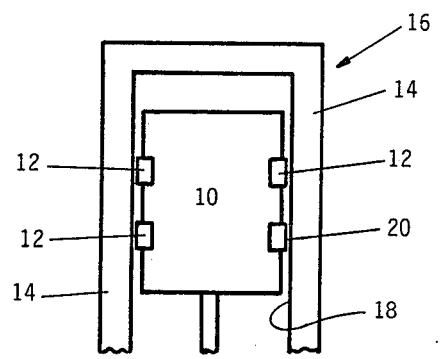
Fig. 1
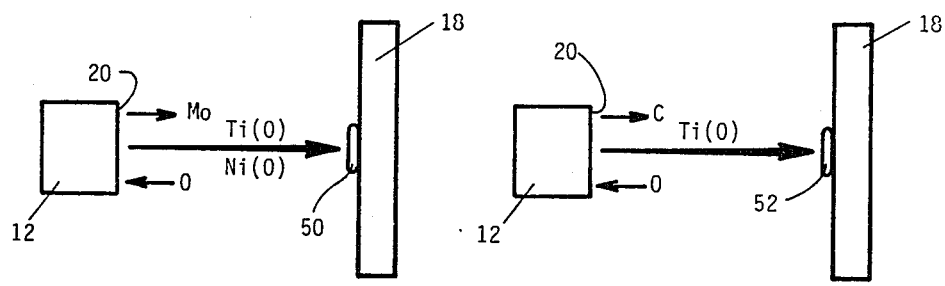
Fig. 2A
Fig. 2B
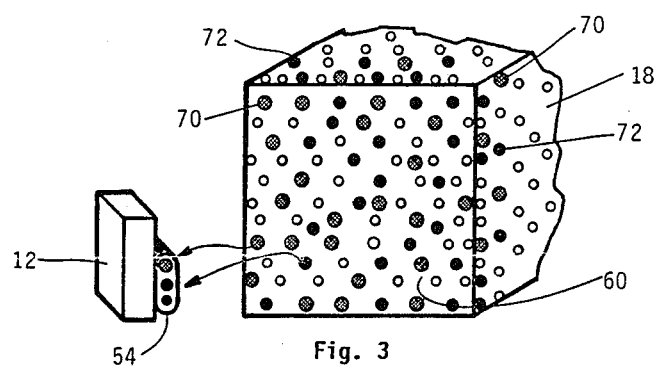
Fig. 3

METHOD OF PRODUCING CERAMIC COMPOSITION HAVING LOW FRICTION COEFFICIENT AT HIGH OPERATING TERMPERATURES

BACKGROUND OF THE INVENTION

This invention relates to sliding seal and cylinder liner compositions for adiabatic engines. Specifically, this invention relates to a stable ceramic composition having a surface with a low coefficient of friction and a high wear resistance at high operating temperatures and a method for producing this composition.

This invention arose under United States Government Contract No. DEN3-352 and the United States Government has a nonexclusive, nontransferable, irrevocable paid-up license to practice or have practiced for or on behalf of the United States this invention throughout the world.

There has been great interest in developing an uncooled, ceramic diesel engine since ten to thirty percent of the work output of an internal combustion engine is expended on the cooling system. Nearly adiabatic operation and recovery of exhaust heat in a turbocompounding system may increase the thermal efficiency of such an engine to 48%. Additional benefits may include multi-fuel capability, reduced noise, reduced white smoke emissions, lower compression ratio, and reduced maintenance. Further, such an engine may be lighter and easier to produce because of the elimination of the need for a cooling jacket. In comparison to the overall effort on ceramic diesel engine development, little work has been done in the important area of developing a sliding seal/cylinder liner system capable of performing adequately under harsh conditions.

This invention relates to providing promising ceramic materials for piston rings and cylinder walls in the abiabatic diesel engine. There has been some progress in development of ceramic pistons (or piston caps) and cylinder liners for adiabatic engines but most designs involve a piston cap in a crosshead engine using conventional chromium-plated cast iron rings and low-temperature lubrication, which offers a very low coefficient of friction (about 0.05) and low wear rates. However, in a radiatorless engine, the temperature of the metal is likely to become unacceptably hot. Also, this type of design is bulky, involving extra piston weight and high inertial forces to the connecting rod as well as on the joint between the piston and the ceramic piston cap.

On the other hand, a simpler design in which the entire cylinder is cermic-lined requires that the piston rings slide against the ceramic liner, which will be quite hot. There is an urgent need to find materials from which sliding seal rings can be manufactured which will exhibit low friction and low ring/liner wear while sliding against a ceramic cylinder liner at high velocity and high temperature.

The piston crown temperature must be raised to over 880° C. in order to achieve significant energy savings in the adiabatic diesel. Thus the prime requirement of the cylinder liner/seal ring system is resistance to thermal shock and retention of strength to temperatures much higher than that which the top ring in a conventional diesel may experience. The liner/ring combination must exhibit acceptable wear rates not only at high temperatures, but also at high velocities of as much as 5-10 meters per second, and under conditions of exposure to combustion products and excess oxygen. Low friction is essential. The liner materials of interest have been silicon carbide, silicon nitride, and partially-stabilized zirconia. The silicon carbide, although it has been used for solid lifters and precombustion chambers in the heavy-duty diesel program, has a high thermal conductivity, which reduces its usefulness for piston crown and cylinder liner applications.

Silicon nitride has been the material of choice in most recent work, because of its low thermal conductivity, relatively high strength at temperatures to about 1100° C., resistance to thermal shock, and relative ease of manufacturing complex shapes. However, in the push for higher temperatures still, the limits of silicon nitride are already being approached. Interest exists in using zirconia because it is strong even at 1500° C. and has better insulating properties than silicon nitride.

Although there is little experimental data on friction and wear of ceramics under conditions that would be experienced by the sliding piston seal in an advanced diesel engine, the information that is available is fairly consistent in that the carbides are identified as outstanding sliding seal materials. In work done by Finkin, Calabrese, and Peterson, as noted in ASLE Preprint #72LC-7C-2 (1972), oscillatory pin-on-plate sliding experiments were performed with various ceramic/cermet couples in air at 316°–982° C. A nickel molybdenum (Ni-Mo) bonded titanium (TiC) carbide cermet, sliding on dense magnesia-stabilized zirconia, was identified as the most promising material couple. A poor second was the nickel-molybdenum (Ni-Mo) bonded titanium (TiC) sliding on itself. Zirconia sliding on itself suffered catastrophic wear.

BRIEF DESCRIPTION OF THE INVENTION

The present invention is directed to carbide seal ring/ceramic cylinder liner combinations for use in the high performance, near adiabatic diesel engine and a method for producing such ceramic liners. The combinations include TiC and Ni-Mo-TiC rings running against silicon nitride and partially-stabilized zirconia cylinder liner compositions, under conditions of the service environment of seal rings in the adiabatic diesel.

Further, the silicon nitride and partially-stabilized zirconia cylinder compositions are ion implanted with one or more layers of metal ions such as cobalt, nickel, titanium, niobium, silver, zinc, copper, zirconium, or yttrium. Implantation is performed by vapor depositing films of a first metal ion, for example, Ni, and then a second metal ion, for example, Ti, each deposition being followed by ionmixing using Ar ions at an accelerating potential of 140 KeV. Ion fluence is $1 \times 10^{17}$ ions/cm$^2$, and the ion flux is $1 \times 10^{12}$ ions/cm$^2$ seconds. The ion implanted cylinder material is then oxidized in an air or a representative diesel exhaust environment at 600° C.—800° C. for approximately 30 minutes to form a lubricious, near surface, oxide layer on the surface of the ion-implanted ceramic. At high temperatures, such as 800° C.–1200° C. and above, the lubricious oxide transfers to the sliding seal ring to form a stable lubricating film.

BRIEF DESCRIPTION OF THE DRAWINGS

FIG. 1 illustrates cross-sectional view of a typical piston/cylinder arrangement in an adiabatic diesel engine.

FIGS. 2A and 2B illustrate film-lubricant transfers in the sliding seal and cylinder liner system without ion implantation and oxidization.

FIG. 3 illustrates the surface gradient layer and transfer mechanisms of the present invention.

DETAILED DESCRIPTION OF THE INVENTION

Referring now to the drawings in greater detail wherein the figures are for the purpose of illustrating preferred embodiments of the present invention only and not for the purpose of limiting the same, a cross-sectional view of a typical piston/cylinder arrangement in an adiabatic diesel engine is illustrated in FIG. 1. Piston 10 having piston rings or sliding seals 12 is housed in cylinder 14 of engine 16. Typically, piston rings 12 are compression loaded against inner cylinder wall 18 whereby the outer ring surface 20 slides along inner wall 18 during operation. Ideally, there is no direct contact between the ring surface 20 and the wall 18 but rather a thin lubricant film separates the surface 20 and the wall 18.

During operation of engine 16 extremely high temperatures are generated within cylinder 14 often causing conventional lubricants to simply break down or vaporize. Upon lubricant breakdown or vaporization ring surface 20 contacts wall 18 and detrimental wear is experienced on both the seal 12 and the wall 18. It is to be understood that wall 18 could be a cylinder liner.

FIG. 2A is a detailed illustration of seal 12 and wall 18 in a representative diesel exhaust environment of 7.8% $CO_2$, 8.9% $O_2$, balance $N_2$, at approximately 40 psi pressure, 800° C. temperature. In FIG. 2A, seal 12 is a nickelmolybdenum bonded titanium carbide cermet (Ni-Mo-TiC) while wall or cylinder liner 18 is partially-stabilized zirconia. As ring 12 slides along wall 18, molybdenum, Mo, ions are released from rings 12 while oxygen, O, reacts with the ring materials to form titanium and nickel oxides, Ti(O) and Ni(O). These oxides transfer to wall 18 during operation of the engine, and it is believed function to form discontinuous, but relatively lubricious, films 50. Molybdenum ions do not transfer since at 800° C. Mo rapidly volatilizes as $MoO_3$.

Likewise, FIG. 2B illustrates the formation of the discontinuous, lubricious film where the ring material is hot-pressed titanium carbide, TiC, and the liner 18 is silicon nitride, $Si_3N_4$. FIG. 2B shows the transfer of the titanium oxides to wall 18 to form lubricious film 52.

Test results involving standard pin (simulated ring 12) -on-disk (simulated liner 18) experiments performed at 800° C., 5 pounds normal force, and pin-ring relative velocities of 1 m/s, have shown that ceramic friction and wear couples, such as discussed above, which have not been ion-implanted, as hereinafter discussed, exhibit friction coefficients greater than 0.35. The couples degrade by a variety of wear mechanisms, leaving a disk wear track of measurable (using surface profilometry) depth.

However, when liner ceramics 18 have been ion-mixed with metal ions and oxidized at high oxidizing temperatures as described below, friction coefficients and wear resistance improve significantly. For example, in FIG. 3, liner wall 18 of partially stabilized zirconia (PSZ) has been implanted with titanium, Ti, and nickel, Ni, mixed, and oxidized at high oxidizing temperatures to form a near surface gradient layer of oxides and the underlying PSZ. Liner wall 18 could also be silicon nitride, $Si_3N_4$, or other comparable ceramic composition.

Implantation is achieved by first depositing a thin film (approximately 400 angstroms thick) of a metal ion such as nickel, Ni, upon the surface of the wall of ceramic composition of partially-stabilized zirconia. Metal ions such as nickel, titanium, niobium, silver, zinc, copper, zirconium and yttrium are also suitable selections for deposition. Tests have shown that molybdenum and chromium are not suitable. Deposition may be accomplished by chemical vapor deposition (CVD), vacuum deposition (VD) or otherwise as is known in the art.

Next, the metal ion deposition is ion mixed or implanted using argon, Ar, ions at an accelerating potential of approximately 140 keV. Ion fluence is $1 \times 10^{17}$ ions/cm$^2$, and the ion flux is $1 \times 10^{12}$ ions/cm$^2$ seconds. Ion mixing is commonly known in the art. The ion mixing of the metal ion with the ceramic composition occurs within the outer 0.4–0.5 micrometer thick surface region of the ceramic composition.

A second deposition is then conducted either with the same metal ion or a second metal ion such as a thin film of titanium being deposited by CVD, VD, or otherwise on the surface of the ceramic compositon which has already been implanted with the first metal ion, this second metal ion also being of the group discussed above. Again, there is ion mixing and implantation of the second deposition with the first metal ion and the ceramic composition at the near surface region of the ceramic composition using argon ions at an accelerating potential of approximately 140 keV. The metal ions are mixed together well, but contain relatively little of the underlying ceramic composition. This composite is next oxidized to form a gradient coating.

After mixing and implantation, wall 18 is subjected to approximately a thirty minute soak at approximately 600°–800° C. in moist air or in a representative diesel exhaust environment discussed above, thereby oxidizing the composite and forming the lubricious coating 60. The thickness of the implanted oxide coating is approximately 0.4–0.5 micrometers. The mixed ions form a gradient of oxides throughout the near surface region (0.4–0.5 micrometers) which allows for the gradual release of the oxide during operation of the wall liner at high operating temperatures. Thus a tenacious film is formed on the underlying ceramic composition which is capable of being released and still providing a reservoir of oxide within the wall near surface region.

As can be seen in FIG. 3, the composite gradient coating 60 yields metal oxides, such as titanium oxide 70 and nickel oxide 72, which transfer from wall 18 to seal 12 during operation of the engine (greatly exaggerated in FIG. 3). It is believed that the oxidizing of the implanted coating produces the stable lubricant 54. With the ionimplanted ceramic composition obtained from the above process, low friction coefficients and high wear resistance at high operating temperatures are obtained.

In particular, standard pin (simulated ring) -on-disk (simulated liner) test results on the implanted materials at 80° C., 5 pounds normal force, and pin-ring relative velocities of 1 m/s, have shown that friction coefficients between 0.09 and 0.14 are obtained. For these coefficients of friction, pin and disk wear is unmeasurable using profilometry techniques.

It has been found that the deposition, implantation, and oxidization of a single layer of cobalt ions using the above discussed procedures yields significantly reduced friction coefficients at operating temperatures from 800° C.–1200° C. and above.

While it has been shown, described and pointed out the fundamental novel features of the invention as applied to a preferred embodiment thereof, it will be understood that various omissions, substitutions and changes in the form and details of the device illustrated and in its operation may be made by those skilled in the art without departing from the spirit of the invention. It is the intention, therefore, to be limited only as indicated by the scope of the claims appended hereto.

We claim:

1. Method for producing a stable ceramic composition having a surface with a low friction coefficient and high wear resistance at high operating temperatures comprising the steps of:
   a first deposition of a thin film of a metal ion upon said surface of said ceramic composition;
   a first ion implantation of at least a portion of said metal ion into the near surface region of said composition said implantation mixing said metal ion and said ceramic composition to form a near surface composite; and
   oxidizing said composite sufficiently at high oxidizing temperatures to form an oxide gradient layer in said surface of said ceramic composition.

2. The method of claim 1, wherein said high oxidizing temperatures are in excess of 600° C.

3. The method of claim 1, wherein said metal ion is cobalt.

4. Method for producing a stable ceramic composition having a surface with a low friction coefficient and high wear resistance at high operating temperatures comprising the steps of:
   a first deposition of a thin film of a first metal ion upon said surface of said ceramic composition;
   a first ion implantation of at least a portion of said first metal into the near surface region of said cermic composition;
   a second deposition of a thin film of a second metal ion upon said surface of said ceramic composition;
   a second ion implantation of at least a portion of said second metal into said near surface region of said ceramic composition, said second implantation mixing said first metal, said second metal, and said ceramic composition to form a composite; and
   oxidizing said composite sufficiently at high oxidizing temperatures to form an oxide gradient layer in said surface of said ceramic composition.

5. The method of claim 4, wherein said first and said second metal ions are any of the following: cobalt, nickel, titanium, niobium, silver, zinc, copper, zirconium, or ytrium.

6. The method of claim 4, wherein said high oxidizing temperatures are in excess of 600° C.

7. The method of claim 6, wherein said first metal ion is cobalt.

8. The method of claim 6, wherein said high oxidizing temperature is in excess of 600° C.

* * * * *